(12) United States Patent
Smith et al.

(10) Patent No.: US 12,049,280 B2
(45) Date of Patent: Jul. 30, 2024

(54) CONNECTED HANDLEBAR FOR VEHICLE

(71) Applicant: VEL'CO, Nantes (FR)

(72) Inventors: Johnny Smith, Nantes (FR); Romain Savouré, Nantes (FR); Pierre Regnier, Saint Herblain (FR)

(73) Assignee: VEL'CO, Nantes (FR)

( * ) Notice: Subject to any disclaimer, the term of this patent is extended or adjusted under 35 U.S.C. 154(b) by 0 days.

(21) Appl. No.: 18/251,626

(22) PCT Filed: Oct. 27, 2021

(86) PCT No.: PCT/EP2021/079786
§ 371 (c)(1),
(2) Date: May 3, 2023

(87) PCT Pub. No.: WO2022/101008
PCT Pub. Date: May 19, 2022

(65) Prior Publication Data
US 2023/0406441 A1    Dec. 21, 2023

(30) Foreign Application Priority Data
Nov. 13, 2020   (FR) ..................................... 2011636

(51) Int. Cl.
*B62K 21/12*   (2006.01)
*B62J 45/422*   (2020.01)
*B62K 21/26*   (2006.01)

(52) U.S. Cl.
CPC ............ *B62K 21/12* (2013.01); *B62J 45/422* (2020.02); *B62K 21/26* (2013.01)

(58) Field of Classification Search
CPC ............................. B62K 21/12; B62J 45/422
See application file for complete search history.

(56) References Cited

U.S. PATENT DOCUMENTS

| 10,730,575 B2 | 8/2020 | Regnier et al. |
| 2017/0080993 A1 | 3/2017 | Bierwerth et al. |

(Continued)

FOREIGN PATENT DOCUMENTS

| DE | 102019125080 A1 * | 3/2020 | ......... A63B 21/0054 |
| DE | 102019112052 A1 * | 11/2020 | ............. B62K 21/12 |

(Continued)

OTHER PUBLICATIONS

USPTO Translation (retrieved from FIT database) of the Description of EP 2942245 A1, Wilhelm, Nov. 11, 2015. (Year: 2024).*

(Continued)

*Primary Examiner* — Daniel D Yabut
(74) *Attorney, Agent, or Firm* — David D. Brush; Westman, Champlin and Koehler, P.A.

(57) ABSTRACT

A handlebar for a vehicle. The handlebar includes: a bar having a coupling end; an end piece that longitudinally extends the coupling end; an electronic processing unit housed in the bar; an antenna for transmitting and receiving electronic data coupled to the electronic processing unit, intended to allow an exchange of electronic data with a telecommunication network; and a receiver of a satellite navigation and positioning system, the receiver being coupled to the electronic processing unit. The antenna and the receiver are housed in an external part of the end piece, the antenna being interposed between the receiver and the coupling end.

8 Claims, 2 Drawing Sheets

(56) References Cited

U.S. PATENT DOCUMENTS

2017/0369125 A1* 12/2017 Katsura .................. B62M 6/55
2019/0002053 A1*  1/2019 Kakinoki ............... B62K 19/40
2019/0127005 A1    5/2019 Regnier et al.

FOREIGN PATENT DOCUMENTS

| EP | 2942244 | A1 |   | 11/2015 |            |
|----|---------|----|---|---------|------------|
| EP | 2942245 | A1 |   | 11/2015 |            |
| EP | 3597520 | A1 | * | 1/2020  | B62K 21/12 |
| WO | 2017207782 | A1 |   | 12/2017 |        |
| WO | 2020178488 | A1 |   | 9/2020  |         |

OTHER PUBLICATIONS

USPTO Translation (retrieved from FIT database) of the Description of WO 2020178488 A1, Regnier et al., Sep. 10, 2020. (Year: 2024).*

Utilisation Manuel D, "Winkbar" Mar. 1, 2020 (Mar. 1, 2020), pp. 1-28, Retrieved from the Internet: https://velco.tech/wp-content/uploads/2020/03/usermanual10.pdf, XP055813140.

English translation of the Written Opinion of the International Searching Authority dated Dec. 10, 2021 for corresponding International Application No. PCT/EP2021/079786, filed Oct. 27, 2021.

International Search Report dated Dec. 10, 2021 for corresponding International Application No. PCT/EP2021/079786, filed Oct. 27, 2021.

Written Opinion of the International Searching Authority dated Dec. 10, 2021 for corresponding International Application No. PCT/EP2021/079786, filed Oct. 27, 2021.

\* cited by examiner

CONNECTED HANDLEBAR FOR VEHICLE

CROSS-REFERENCE TO RELATED APPLICATION

This application is a Section 371 National Stage Application of International Application No. PCT/EP2021/079786, filed Oct. 27, 2021, which is incorporated by reference in its entirety and published as WO 2022/101008 A1 on May 19, 2022, not in English.

FIELD OF THE DISCLOSURE

The field of the invention is that of the design and manufacture of vehicle equipment with handlebar.

The invention relates more precisely to a handlebar for a vehicle, such as a bicycle, that has electronic components to enable the handlebar to send and receive electronic information.

BACKGROUND OF THE DISCLOSURE

In the field of the invention, handlebars for vehicles produced from varied materials are known. For example, aluminium, carbon, wood or plastics material can be used for manufacturing handlebars.

A handlebar comprises a bar and a stem to which the bar is attached. To ensure use of the handlebar in complete safety, the bar and the stem of the handlebar must have sufficiently great structural strength.

To provide this structural strength, the bars of handlebars have specific designs according to the materials used for producing them. For example, to be able to have sufficient structural strength, bars made from wood or plastics material are generally solid. These bars then have high stiffness enabling them to be homologated by the various competent bodies.

Bars are also known with a hollowed structure, but produced with materials such as steel or aluminium, thus enabling the bars to have sufficient stiffness to be able to be homologated.

In the field of the invention, the bicycle handlebar described in the patent document published under the number WO 2017/207782 A1 is also known.

The handlebar described in this document is said to be "connected".

More precisely, this bicycle handlebar comprises a bar able to receive an electronic control unit, wireless communication means comprising an antenna, and electrical batteries. This bicycle handlebar can establish a wireless connection with a mobile telephone.

The quality of the wireless connectivity of the bicycle handlebar does however pose a problem. This is because the ability to send and receive radio waves is particularly impacted by the very nature of the bar: a metal tube. Such a metal tube constitutes in fact an electromagnetically impermeable environment able to disturb or prevent the broadcasting of electromagnetic waves.

Consequently an antenna cannot be directly integrated inside the metal tube forming the bar.

Producing a window on the bar by means of a cutout on the metal tube would make it possible to integrate the antenna so that the latter can receive and transmit electromagnetic waves. Such a window would however call into question the structural strength of the handlebar while not making it possible to obtain good quality of broadcasting of the electromagnetic waves.

This is because, because of its shape and the nature of the material from which it is formed, a metal tube gives rise to an environment unsuitable for the broadcasting of an electromagnetic wave. This property is such that even the metal tube, without structural modification liable to degrade its structural strength, cannot be simply used as an antenna.

In addition, even an antenna taking the form of a rod extending radially from the metal tube of the bar, despite harmonious integration, could exhibit degraded performances.

The patent document published under the number EP 2942244 A1 describes a monitoring and locating system that can be integrated in a bicycle handlebar. A plurality of antennas are integrated in an end piece fitted at the end of a main body of the bar of a handlebar. It is found that the ability of the antennas to transmit and receive radio waves is not optimum.

The applicant has implemented several research and development campaigns on the subject that have in particular led to the filing of the patent application published under the number WO 2020/178488. The system described in this patent document makes it possible to optimise the operation of various antennas integrated in a handlebar.

This solution, which is satisfactory with regard to the operations of the antennas, does however give rise to a loss of visible simplicity of the handlebar, which is then provided with additional housings distributed along its bar.

In addition, the connectivity requirements of such a connected handlebar can be simplified and only a receiver of a satellite navigation and positioning system, referred to as a "geolocation receiver", and an antenna for transmitting and receiving wireless data, for example of the GPRS type, are essential.

There is thus a need relating to a harmonious and simple integration in appearance of a telecommunication antenna and a geolocation receiver on a bicycle handlebar.

SUMMARY

A non-limiting exemplary embodiment of the present disclosure proposes a handlebar that integrates the antenna and the geolocation receiver in a satisfactory manner with regard to their ability to operate in the end piece coupled to an end of the bar of the handlebar.

An exemplary embodiment of the present disclosure relates a handlebar for a vehicle, comprising:
  a bar having an internal volume, extending longitudinally between two end portions, including a portion referred to as the "coupling end", which has a central extension axis;
  an end piece having an internal part inserted in the coupling end of the bar, and an external part that longitudinally extends the coupling end along the central extension axis, the external part being designed in an electromagnetically permeable material;
  an electronic processing unit housed in the internal volume of the bar;
  an antenna for transmitting and receiving electronic data coupled to the electronic processing unit, the antenna having an elongate shape extending along a longitudinal axis and being intended to allow an exchange of electronic data with a telecommunication network;
  a receiver of a satellite navigation and positioning system, the receiver being coupled to the electronic processing unit;
  the handlebar having two preferential gripping zones intended to be gripped by hand during use of the handlebar, one of which, referred to as the "emissive zone", is located at the coupling end, characterised in that the antenna and the receiver are housed in the external part of the end piece, the longitudinal axis of the antenna being parallel to the central extension axis, and the antenna being located at least partially in the emissive zone, and in that the antenna is interposed along the central extension axis between the receiver and the coupling end, the receiver being separated from the emissive zone.

The handlebar according to an exemplary embodiment of the disclosure has simple visual integration of its electronic components.

This is because the antenna and the geolocation receiver are both located inside the end piece coupled to the end of the handlebar. There is then no additional housing on the handlebar, which has a conventional appearance, comparable to that of a non-connected handlebar.

In addition, the operation of the assembly formed by the antenna and the geolocation receiver is optimised despite a negative effect of the antenna on the geolocation receiver.

This is because the antenna conventionally produces electromagnetic disturbances during the reception and transmission of data. The positioning of the geolocation receiver in the immediate vicinity of the antenna thus causes disturbances to the operation of the receiver.

Contrary to the technical recommendations, the solution according to an exemplary embodiment of the disclosure proposes interposing the antenna between the geolocation receiver and the end of the handlebar where the electronic processing unit is located.

This positioning causes the occurrence of disturbances produced by the antenna on the connection between the geolocation receiver and the electronic processing unit that must necessarily pass alongside the antenna. In addition, the antenna cannot have optimum operation while being positioned directly in the vicinity of the bar of the handlebar, the material of which is liable not to be electromagnetically permeable.

A design according to the technical recommendations would then lead to positioning the antenna in a distal manner with respect to the bar to allow better data reception and transmission, and to make it possible to interpose the geolocation receiver between the antenna and the coupling end of the handlebar.

However, this design envisaged by the inventors does not produce a satisfactory result because of an effect of masking the geolocation receiver by the hand of the user when they are using the vehicle equipped with the handlebar.

Thus, by positioning the geolocation receiver in a distal manner with respect to the bar, the effect of masking by a hand is minimised, the users having a tendency to grip the handlebars by the preferential gripping zones, which are conventionally closer to the gear and braking actuators than to the distal ends of the handlebars.

The operation of the geolocation receiver, although having a connection with the electronic unit disturbed by the operation of the antenna, is then better than that of the recommended solution, and sufficient to allow good operation of the geolocation functions of the handlebar.

The operation of the antenna is for its part less good than that which can be obtained with the recommended design.

Nevertheless, the overall operation of the antenna and of the geolocation receiver is much more satisfactory and technically valid than the obvious design with regard to the technical recommendations.

According to a preferred design, and according to an orthogonal projection on the central extension axis, the antenna and the receiver follow each other or are separated from each other.

In other words, and still according to an orthogonal projection on the central extension axis, the antenna and the receiver do not have any overlap. The operation of the antenna is only slightly disturbed because the electromagnetic waves tend to diffuse around the antenna particularly to its longitudinal axis.

Preferentially, the receiver is coupled to the electronic processing unit by a shielded connection at least at the antenna along the central extension axis.

In this way, the connection of the receiver to the electronic processing unit is no longer disturbed, or is less disturbed, by the disturbances that the antenna is liable to produce on this connection.

According to an advantageous feature, the antenna and the receiver are mounted on a first electronic card mounted fixed in the end piece, the end piece having a position and an orientation predetermined with respect to the bar.

The mounting of the antenna and of the receiver in the end piece is thus simplified and their positions are always ensured through the predetermination of the position of the end piece with respect to the bar of the handlebar and of the position of the electronic card with respect to the end piece.

According to a preferred solution, the handlebar has a predefined sky/ground orientation, the first electronic card being mounted transversely with respect to this predefined sky/ground orientation, and the receiver being mounted on an upper face of the electronic card, intended to be oriented towards the sky.

By means of this solution, the receiver always has a position optimising its operation while being oriented towards the sky to receive the signals sent by a constellation of geolocation satellites.

According to an advantageous design, the antenna is mounted on a lower face of the first electronic card.

Such a design makes it possible to minimise the size of the end piece by moving the antenna as close as possible to the antenna of the receiver along the central extension axis while separating them from each other by means of the positioning on either side of the electronic card. This design also makes possible to minimise the total length of the elements inserted in the bar of the handlebar, thus enabling the bar to have a curvature close to the emissive zone.

Advantageously, the external part of the end piece has a length less than 50 millimetres along the central extension axis, and advantageously greater than 35 millimetres.

Such a sizing of the end piece enables the bar to meet the regulatory requirements in terms of structural strength and enables the end piece to have a sufficient length to house the antenna and the receiver and to guarantee them the possibility of operating in a suitable manner.

Another aspect of the present disclosure relates to a vehicle comprising a handlebar as described above.

BRIEF DESCRIPTION OF THE DRAWINGS

Other features and advantages of the invention will emerge more clearly from the reading of the following description of a preferential embodiment of the invention, given by way of illustrative and non-limitative examples, and the accompanying drawings, among which.

DETAILED DESCRIPTION OF ILLUSTRATIVE EMBODIMENTS

Figure 1:
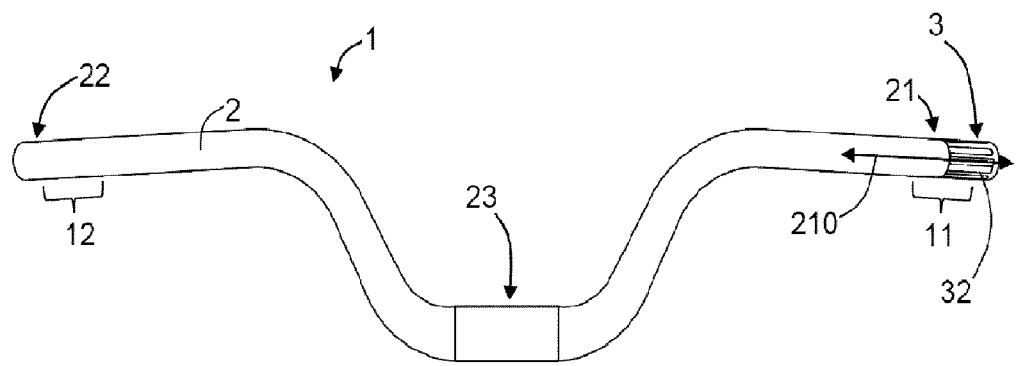
FIG. 1 is a schematic representation of a handlebar according to an exemplary embodiment of the disclosure comprising a bar and an end piece located at one of the ends of the bar.

With reference to FIG. 1, a handlebar 1 according to an exemplary embodiment of the disclosure is shown. The handlebar 1 is a handlebar for a vehicle.

The vehicles comprising the handlebar according to an exemplary embodiments of the disclosure can in particular be bicycles or scooters.

The handlebar 1 according to an exemplary embodiment of the disclosure is more particularly adapted for electric vehicles provided with electric propulsion.

As detailed hereinafter, the handlebar 1 can be connected to an electrical assistance kit of said vehicle.

Figure 2:
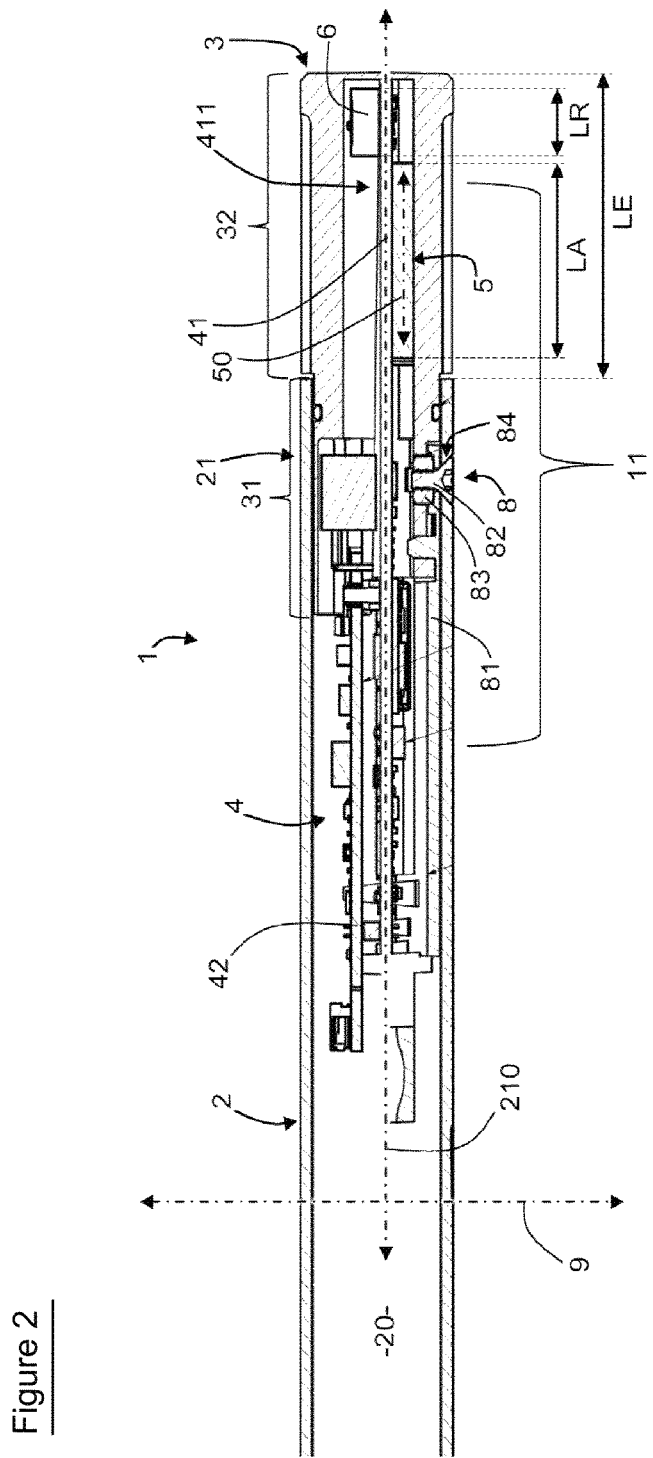
FIG. 2 is a schematic representation in a cross section of the end piece and of the portion of the bar to which the end piece is coupled.

With reference to FIGS. 1 and 2, the handlebar 1 has two preferential gripping zones that are intended to be gripped by hand during use of the handlebar 1. These two preferential gripping zones may for example be equipped with sheaths made from foamed material to make gripping these zones more pleasant.

With reference to FIGS. 1 and 2, the handlebar 1 comprises:
  a bar 2;
  an end piece 3.

The bar 2 extends longitudinally between two end portions, including a first end portion referred to as the "coupling end 21", and a second end portion 22.

As illustrated by FIGS. 1 and 2, the coupling end 21 has a central extension axis 210. More precisely, this first portion extends in a rectilinear manner along its central extension axis 210.

The bar 2 also has a central zone 23 intended for example to form a zone for coupling the bar 2 to a stem of a vehicle.

According to the present embodiment, the bar 2 has a circular cross section. Consequently, the coupling end 21 takes a cylindrical form of revolution about the central extension axis 210.

With reference to FIG. 2, the bar 2 has an internal volume 20.

The bar 2 is in particular formed from a tube.

By way of example, the bar 2 is formed from a metal or from a metal alloy. This type of material has high structural strength and relative impermeability to electromagnetic waves.

On the same side as the coupling end 21, the bar 2 has a shorter length, from the central zone 23, than on the same side as the second end 22.

The end piece 3 is intended to be coupled to the coupling end 21 of the bar 2. This end piece 3 extends the coupling end 21 and enables the handlebar to have the same length on either side of the central zone 23.

The end piece 3 longitudinally extends the coupling end 21 along the central extension axis 210.

More precisely, the end piece 3 has an internal part 31 and an external part 32.

The internal part 31 is inserted in the coupling end 21 of the bar 2.

As for the external part 32, this extends from the internal part 31. In other words, only the external part 32 longitudinally extends the coupling end 21 along the central extension axis 210.

This external part 32 is designed in a material permeable to electromagnetic waves. More particularly, the external part is formed from fibre-reinforced plastics material.

With reference to FIG. 2, the end piece 3 has a position and an orientation predetermined with respect to the bar 2. This is because the handlebar 1 comprises means 8 for holding the end piece inside the bar 2. These holding means 8 prevent the end piece from turning about the central extension axis 210 inside the bar 2.

The holding means 8 comprise a carriage 81, a screw 82 and a nut 83.

The carriage 81 is intended to be completely inserted in the coupling end 21 of the bar 2.

The internal part 31 of the end piece 3 is assembled on the carriage 81, thus making the carriage 81 and the end piece 3 integral with each other once they are inserted in the coupling end 21.

The nut 83 is held fixed with respect to the carriage 81 and end piece 3. This is because the carriage 81 and the internal part 31 of the end piece 3 form together a housing for the cavity of the nut 83.

When the carriage 81 and the end piece 3 are in position with respect to the bar 2, the nut 83 is then opposite a hole 84 provided on a lower face of the bar 2. The screw 82 can then be screwed in the nut 83 to lock the carriage 81 and the end piece 3 in position in the bar 2. This carriage 81 and the end piece 3 are then immobile with respect to the bar 2 and can then no longer slide in the bar 2 along the central extension axis 210, nor turn about this axis.

As mentioned previously and with reference to FIGS. 1 and 2, the handlebar 1 has two preferential gripping zones. The two preferential gripping zones are more precisely composed of a first so-called "emissive zone" 11 that is located on the same side as the coupling end 21, and a second gripping zone 12 located on the same side as the second end 22.

The emissive zone 11 is formed by a part of the external part 32 of the end piece 3, and as well as by a part of the coupling end 21.

The coupling end 21 and the external part 32 of the end piece 3 are intended to accommodate electronic components, the external part 32 accommodating in particular components able to receive and/or transmit electromagnetic signals.

This is because the handlebar 1 according to an exemplary embodiment of the disclosure also comprises:
  an electronic processing unit 4;
  an antenna 5 for transmitting and receiving electronic data coupled to the electronic processing unit 4;
  a receiver 6 of a satellite navigation and positioning system, the receiver 6 being coupled to the electronic unit 4.

With reference to FIG. 2, the electronic processing unit 4 is housed in the internal volume 20 of the bar 2.

The electronic processing unit 4 is composed of electronic cards 41, 42, including a first electronic card 41 and a second electronic card 42, and of electronic components coupled to the electronic cards 41, 42, such as for example a microcontroller and a memory.

This electronic processing unit 4 can in particular be connected to the electrical assistance kit of an electric vehicle equipped with the handlebar 1.

As detailed hereinafter, the electronic processing unit 4, the antenna 5 and the receiver 6 are held in position with respect to the bar 2 by the end piece 3 and the holding means 8.

Figure 3:
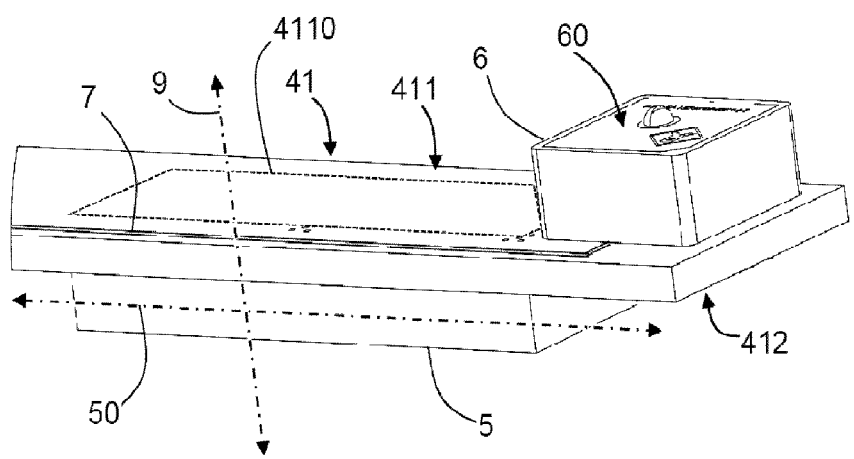
FIG. 3 is a schematic representation in perspective of an electronic card having a receiver of a satellite navigation and positioning system as well as an antenna for transmitting and receiving electronic data intended to allow an exchange of electronic data with a telecommunications network.

With reference to FIGS. 2 and 3, the antenna 5 for transmitting and receiving electronic data has an elongate shape that extends along a longitudinal axis 50. This antenna 5 is intended to allow an exchange of electronic data with a telecommunications network.

This antenna 5 corresponds for example to the antennas used in mobile telephones.

This type of antenna 5 is conventionally the origin of electromagnetic radiations extending perpendicular to the longitudinal axis 50, during the transmission of electronic data.

The receiver 6 of a satellite navigation and positioning system is for its part of the type having an upper face 60 intended to be oriented towards the sky to optimise the capture of signals sent by geolocation satellites of a constellation.

According to the principle of an exemplary embodiment of the disclosure, and as illustrated by FIG. 2, the antenna 5 and the receiver 6 are housed in the external part 32 of the end piece 3. More precisely, the antenna 5 and the receiver 6 are entirely housed in the external part 32 and are thus not located in the internal volume 20 of the bar 2.

The longitudinal axis 50 of the antenna 5 is parallel to the central extension axis 210. Thus the electromagnetic waves transmitted by the antenna 5 are transmitted perpendicularly to the central extension axis 210 of the coupling end 21 of the bar 2 and the transmission and reception are not disturbed, or only a little so, by the material forming this coupling extension 21, and more generally by the material of the bar.

The antenna 5 is then at least partially located in the emissive zone 11.

Still according to FIG. 2, and according to the principle of an exemplary embodiment of the disclosure, the antenna 5 is interposed along the central extension axis 210 between the receiver 6 and the coupling end 21. In other words, the antenna 5 is located proximally to the coupling end 21 while the receiver 6 is located distally to this coupling end 21.

The receiver 6 is then separated from the emissive zone 11.

As illustrated by FIG. 2, and according to projections orthogonal to the central extension axis 210, the external part 32 of the end piece 3 has a length LE, the antenna a length LA and the receiver a length LR. The lengths LA and LR are located in the length LE without overlapping each other. Thus, according to these orthogonal projections on the central extension axis 210, the antenna 5 and the receiver 6 follow each other, or have an even minimal separation between them.

In other words, the antenna 5 and the receiver 6 do not overlap along the central extension axis 210.

Still with reference to FIG. 2, the length LE of the external part of the end piece 3 is less than 50 mm along the central extension axis 210 and is advantageously greater than 35 mm. This length LE is in particular equal to 41 mm.

As mentioned previously, the electronic processing unit 4 comprises a first electronic card 41 and a second electronic card 42.

With reference to FIGS. 2 and 3, the first electronic card 41 carries the antenna 5 and the receiver 6 to which they are coupled.

According to the present embodiment, the first electronic card 41 is mounted fixed in the end piece 3.

This is because the carriage 81 of the holding means 8 forms a coupling support for the electronic cards 41, 42, and the end piece 3 has a cavity accommodating the first electronic card 41. Since the end piece 3 is held fixed with respect to the carriage 81, the first electronic card 41 is also held fixed with respect to the end piece 3.

As mentioned previously, the holding means 8 enable the end piece 3 to have a predetermined position and orientation with respect to the bar 2.

The handlebar 1 is in particular designed to have a predefined sky/ground orientation 9 and the first electronic card 41 is mounted transversely with respect to this sky/ground orientation 9. More specifically and with reference to FIGS. 2 and 3, the first electronic card 41 is mounted perpendicularly to the predefined sky/ground orientation 9.

This first electronic card 41 has a top face 411 and a bottom face 412. The receiver 6 is mounted on the top face 411.

The antenna 5 for its part is mounted on the lower face 412 of the first electronic card 41.

By being mounted on the upper face 411 of the first electronic card 41, the receiver 6 can thus be oriented towards the sky.

In this way, the receiver 6 can have a specific orientation and in particular have its upper face oriented towards the sky, this upper face being designed to be directed towards the geolocation satellites.

According to the present embodiment and with reference to FIG. 3, the receiver 6 is coupled to the electronic processing unit 4, and more specifically to electronic components of the electronic processing unit 4 located in the internal volume of the bar 2, by a shielded connection 7.

This connection 7 is shielded at least at the antenna 5 along the central extension axis 210.

The connection 7 is in this case carried by the first electronic card 41.

As illustrated by FIG. 3, the connection 7 is located on the upper face 411 of the first electronic card 41.

In order to minimise even further the occurrence of interference resulting from the presence and the operation of the antenna 5, the connection 7 is located in proximity to an edge of the first electronic card 41, at least at the antenna 5 along the central extension axis 210.

In other words, the connection 7 is offset laterally on the first electronic card 41, at least at the antenna 5 along the central extension axis 210, and thus along the longitudinal axis 50 of the antenna 5.

The connection 7 is in particular offset laterally on the first electronic card 41 so as to be offset from a zone 4110 of the upper face 411 corresponding to the symmetrical point, on a symmetry plane in which the first electronic card 41 fits, of a coupling location of the antenna 5 on the lower face 412 of the first electronic card 41.

Although the present disclosure has been described with reference to one or more examples, workers skilled in the art will recognize that changes may be made in form and detail without departing from the scope of the disclosure and/or the appended claims.

The invention claimed is:

1. A handlebar for a vehicle, comprising:
   a bar having an internal volume, extending longitudinally between two end portions, including a first end portion referred to as a coupling end, which has a central extension axis;
   an end piece having an internal part inserted in the coupling end of the bar, and an external part that longitudinally extends the coupling end along the central extension axis, the external part being formed in an electromagnetically permeable material;
   an electronic processing unit housed in the internal volume of the bar;
   an antenna for transmitting and receiving electronic data coupled to the electronic processing unit, the antenna having an elongate shape extending along a longitudinal axis and being configured to allow an exchange of electronic data with a telecommunication network;
   a receiver of a satellite navigation and positioning system, the receiver being coupled to the electronic processing unit; and
   first and second preferential gripping zones to be gripped by hand during use of the handlebar, one of which, referred to as an emissive zone, is located at the coupling end,
   wherein the antenna and the receiver are housed in the external part of the end piece, the longitudinal axis of the antenna being parallel to the central extension axis, and the antenna being located at least partially in the emissive zone,
   and wherein the antenna is interposed along the central extension axis between the receiver and the coupling end, the receiver being separated from the emissive zone.

2. The Handlebar according to claim 1, wherein, according to an orthogonal projection on the central extension axis, the antenna and the receiver follow each other or are separated from each other.

3. The Handlebar according to claim 1, wherein the receiver is coupled to the electronic processing unit by a shielded connection at least at the antenna along the central extension axis.

4. The Handlebar according to claim 1, wherein the antenna and the receiver are mounted on a first electronic card mounted fixed in the end piece, the end piece having a predetermined position and orientation with respect to the bar.

5. The Handlebar according to claim 4, characterised in that it wherein the handlebar has a predefined sky/ground orientation, the first electronic card being mounted transversely with respect to the predefined sky/ground orientation, and the receiver being mounted on an upper face of the first electronic card, to be oriented towards the sky.

6. The Handlebar according to claim 5, wherein the antenna is mounted on a lower face of the first electronic card.

7. The Handlebar according to claim 1, wherein the external part of the end piece has a length of less than 50 millimetres along the central extension axis, and greater than 35 millimetres.

8. A vehicle comprising:
   a handlebar comprising:
   a bar having an internal volume, extending longitudinally between two end portions, including a first end portion referred to as a coupling end, which has a central extension axis;
   an end piece having an internal part inserted in the coupling end of the bar, and an external part that longitudinally extends the coupling end along the central extension axis, the external part being formed in an electromagnetically permeable material;
   an electronic processing unit housed in the internal volume of the bar;
   an antenna for transmitting and receiving electronic data coupled to the electronic processing unit, the antenna having an elongate shape extending along a longitudinal axis and being configured to allow an exchange of electronic data with a telecommunication network;
   a receiver of a satellite navigation and positioning system, the receiver being coupled to the electronic processing unit; and
   first and second preferential gripping zones to be gripped by hand during use of the handlebar, one of which, referred to as an emissive zone, is located at the coupling end,
   wherein the antenna and the receiver are housed in the external part of the end piece, the longitudinal axis of the antenna being parallel to the central extension axis, and the antenna being located at least partially in the emissive zone,
   and wherein the antenna is interposed along the central extension axis between the receiver and the coupling end, the receiver being separated from the emissive zone.

* * * * *